United States Patent [19]

Gambini

[11] Patent Number: 5,396,834
[45] Date of Patent: Mar. 14, 1995

[54] COOKING VESSEL BOTTOM AND PRODUCTION METHOD THEREFOR

[75] Inventor: Rino Gambini, Fermignano, Italy

[73] Assignee: TVS S.p.A., Urbino, Italy

[21] Appl. No.: 228,120

[22] Filed: Apr. 15, 1994

Related U.S. Application Data

[63] Continuation-in-part of Ser. No. 886,709, May 21, 1992, abandoned.

[30] Foreign Application Priority Data

Mar. 24, 1992 [IT] Italy .................... MI92A0683

[51] Int. Cl.6 .................................... A47J 37/10
[52] U.S. Cl. ................................ 99/422; 99/447; 99/DIG. 15; 126/390
[58] Field of Search .............. 99/422, 447, DIG. 15; 126/390; 220/626

[56] References Cited

U.S. PATENT DOCUMENTS

| | | | |
|---|---|---|---|
| 1,447,813 | 3/1923 | Patrick | 126/390 |
| 3,593,702 | 7/1971 | Zigomalas | 126/390 |
| 3,777,094 | 12/1973 | Peters, Jr. | 126/390 |
| 3,981,233 | 9/1976 | Nugarus | 99/422 |
| 4,078,479 | 3/1978 | Mori | 99/422 |
| 4,508,100 | 4/1985 | Deville | 126/390 |
| 4,541,411 | 9/1985 | Woolf | 126/390 |
| 4,926,843 | 5/1990 | Vocke et al. | 99/422 |
| 5,076,434 | 12/1991 | Hoffman, Jr. | 99/DIG. 15 |

FOREIGN PATENT DOCUMENTS

| | | | |
|---|---|---|---|
| 0022257 | 1/1981 | European Pat. Off. | 99/422 |
| 0900989 | 1/1954 | Germany | 220/626 |
| 2827461 | 1/1980 | Germany | 99/422 |

Primary Examiner—David A. Scherbel
Assistant Examiner—James F. Hook
Attorney, Agent, or Firm—Bucknam and Archer

[57] ABSTRACT

Flat cooking-vessel bottom the outer surface of which is provided with equidistant concentric grooves in the form of circles and coated with two overlying layers the first of which is in contact with the metal and consists of a material with, high radiation heat absorption capacity distributed uniformly over the entire bottom surface and the second layer consists of an enamel or silk-screen paste resistant to abrasion and scratching distributed nonuniformly and preferably in segments and only on the lands between the surface grooves.

14 Claims, 2 Drawing Sheets

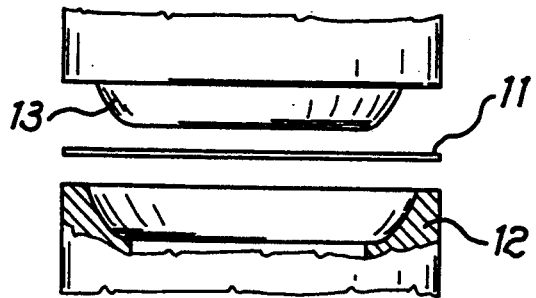
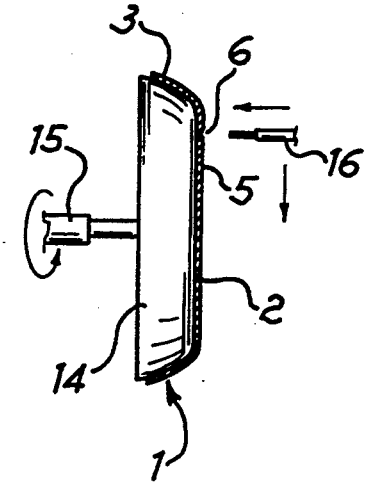
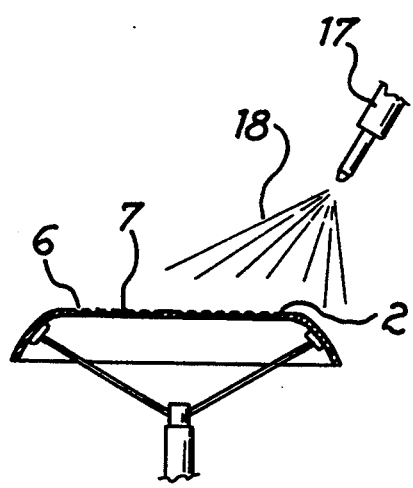
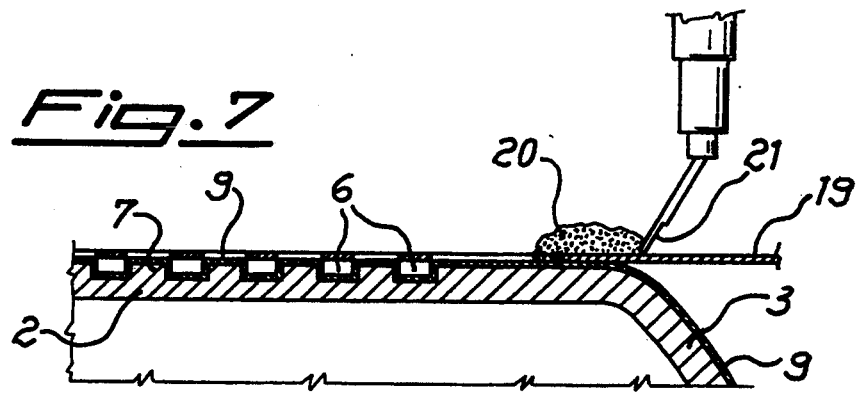

COOKING VESSEL BOTTOM AND PRODUCTION METHOD THEREFOR

This application is a Continuation-In-Part of U.S. Ser. No. 07/886,709, filed May 21, 1992 now abandoned.

FIELD OF THE INVENTION

The present invention relates to a cooking vessel bottom. The invention also relates to the method of production of a cooking vessel bottom as well as vessels containing said bottom.

BACKGROUND OF THE INVENTION

Cooking vessels such as saucepans, frying pans, pans, pie pans, pots and the like are generally made of aluminum or its alloys and have their bottom as flat as possible to ensure complete contact with the heat sources. During heating, however, the bottom surface is not heated uniformly. Indeed, the bottom surface central zone is generally at a temperature relatively higher than that of the marginal zone. In addition, the lower face of the bottom in contact with the heat source is generally hotter than the top face. These temperature differences are the source of different expansion of the metal, reducing the life of the vessel.

A proposal to obviate these shortcomings, according to French patent No. 1,086,887 provides the bottom with concentric undulations or grooves which permit absorption of the deformations due to radial forces created by irregular expansion of the different parts of the bottom. One disadvantage of this type of bottom is that it is capable of absorbing from the heat source only the thermal energy transmitted by direct contact, i.e. the contact heat. The heat transmitted by radiation is reflected from the bright surface of the aluminum or its alloys and thus contributes in reduced measure to heating of the vessel. In addition, since there is a tendency to produce vessel bottoms as thin as possible to save material, very often the flat shape of the bottom is deformed after long use of the vessel. This causes a substantial drop in contact heat transmission.

Another proposal to overcome this shortcoming has been made in U.S. Pat. No. 4,926,843 which describes a process according to which a cooking vessel bottom is provided with concentric and spaced grooves coated with a layer of heat absorbent material only opposite to the grooves while this layer is removed from the surface of the bottom in the zones between the grooves, i.e. in the concentric lands. The heat absorbing material is generally the same enamel used to coat the outer surface of the vessel.

Known enamels designed for coating aluminum or its alloys have the drawback of being soft, i.e. presenting low abrasion and scoring resistance. This drawback is due to the composition of the frit of the enamel used, the cooking temperature of which must be lower than the melting or softening temperature of the aluminum or its alloys. For this reason coating with enamels is limited to the side or internal surfaces (grooves) of the vessel while the surfaces in relief of the bottom remain bare. This limitation of the enamelled surfaces causes incomplete radiation heat absorption.

SUMMARY OF THE INVENTION

One object of this present invention is to solve the above mentioned shortcomings and to provide a cooking vessel bottom surface which permits better heat transmission and, specifically, higher radiation heat absorption and stability in use.

Still another object is to provide a vessel bottom in which heat is transferred both by radiation and by conduction.

Another object is to provide a method for the production of the cooking vessel according to the invention.

In the cooking vessel bottom according to the present invention, the outer surface is provided with equidistant concentric grooves in circular form and is coated with two overlying layers of which the first layer, which is in contact with the metal, consists of a porcelain enamel having high radiation heat absorption capacity distributed uniformly over the entire bottom surface and the second layer consists of a porcelain enamel having high abrasion and scoring resistance distributed nonuniformly and preferably in segments and usually on the parts in relief of the surface between the grooves.

The cooking vessel is produced by conventional pressing or turning of metal plates preferably of aluminum or aluminum alloys. On the flat bottom surface of the vessel thus obtained are formed equidistant circular concentric grooves by removal of bottom material performed with a lathe tool. For this purpose, the vessel is fixed from the interior on a support and rotated around its central axis in relation to a punch having straight line movement.

The dimensions of the grooves are not critical and in general the depth of each groove is between 0.1 mm and 2 mm and the width is between 1 mm and 3 mm. The surface in relief in ring form between the grooves has a width between 1 mm and 3 mm. The distance between the center lines of the grooves can vary between 4 mm and 7 mm.

When the vessel is placed on a hotplate, the contact heat is transferred from the hotplate to the surface of the vessel through conduction. The heat transferred from the hotplate in the form of radiation, so-called radiation heat, is absorbed by the first layer, so that it is conducted to the cooking vessel. In this way, both conduction and radiation heat of the hotplate can be utilized, which results in saving of energy.

The first layer of coating of the vessel may be dark, preferably black and, advantageously, has a matt or dull surface to ensure complete absorption of the radiation heat. It comprises any material having a high radiation heat-absorbing capacity. Generally, it consists of porcelain enamel based on an alkaline borosilicate, to which a pigment is added, if desired.

A typical example of porcelain enamel which can be used for forming the first layer of the coating is that obtained by melt-homogenizing, at a temperature ranging from 1000° to 1500° C., a mixture of 0.1–10% silica, sodium borate feldspar and sodium carbonate both in the amount of 1–60% with respect to silica, and a black pigment in the amount of 0–30% with respect to silica.

When the enamel absorbing the radiation heat is fluid, because of the presence of a solvent, it may be advantageously applied by spraying.

A suitable enamel having high radiation heat absorbing capacity is Alumail Frit AT-6113 sold by Bayer which is an enamel based on a borosilicate.

The second layer of the coating is preferably applied by silk-screen process depositing the silk-screen paste only on the concentric rings in relief and nonuniformly, passing it through a cloth screen with impression of the desired design. This high abrasion material may be Serigraphy Paste DA 710052 or DA 770052 marketed by Bayer AG.

Any porcelain enamel of conventional type for aluminum or aluminum alloys containing hardening agents can be used for preparing the silk-screen paste. Suitable hardening agents added to the ceramic enamel may be alpha-alumina, silicon carbide, quartz, tungsten carbide, silico-aluminates or metals such as tungsten, titanium and stainless steel in the form of fine particles. The hardening agents are added in an amount ranging from 10% to 40% by weight with respect to the ceramic enamel.

The porcelain enamel including the hardening agent is mixed and diluted with pine oil, hydrogenated resin acids, hydrogenated rosin, ethylcellulose and like dispersants or solvents.

Examples of silk-screen paste based on an alkaline borosilicate which can be used for the second layer of the coating are those known on the market under the trade names DA 710015 which is white, DA 210272 which is red, DA 110072 which is black and DA 710052 which is transparent; all the above products are manufactured and sold by Bayer Co.

Other colors of the silk-screen paste can be obtained by mixing these and other known enamels of conventional type for aluminum or aluminum alloys, containing a hardening agent, with colors or pigments. Thus, for example, a dark gold ceramic silk-screen paste can be obtained by mixing DA 71005 (transparent), produced by Bayer and consisting of vitrified gold silicate, with mica coated with iron oxides known on the market under the trade name Mearlin Super Bronze.

The second layer of the coating may be constituted by the same porcelain enamel based on an alkaline borosilicate used for the first layer, to which a hardening agent is added, diluted and mixed with at least one of the above mentioned solvents or dispersants. Actually, it has been found that an excellent adhesion of the second layer to the first one is obtained when the silk-screen paste is formed by the same porcelain enamel based on an alkaline borosilicate used for the first layer to which a hardening agent in the above reported amounts is added.

The silk-screen paste may be colored and any pigment or color may be added. Generally, a color contrasting with that of the first coating layer is preferred so as to obtain aesthetic color effect. The function of the second layer is to avoid or reduce the contact between the first layer and the heating surface or other work surface in order to limit the scoring and abrasion of the first layer and to provide an attractive appearance.

According to one embodiment, the first layer of the coating can be a silicone lake and, in this case, the second layer is a silicone-based enamel, such as the enamel produced and sold by Tego Gold Schmid Co. under the trade name HTF containing dispersed mica coated with iron oxides known on the market under the trade name Mearlin Super Bronze.

BRIEF DESCRIPTION OF THE DRAWINGS

Other features of the present invention will be better understood from the following detailed description of a preferred embodiment thereof with reference to the annexed drawings, wherein:

FIG. 4 is a schematic illustration of the pan forming phase;

FIG. 5 illustrates a schematic illustration of the grooving phase of the bottom;

FIG. 6 illustrates a schematic illustration of the spraying phase of the enamel of the first layer; and FIG. 7 illustrates a schematic phase of the silk-screen process phase.

DESCRIPTION OF THE PREFERRED EMBODIMENT

Figure 1:
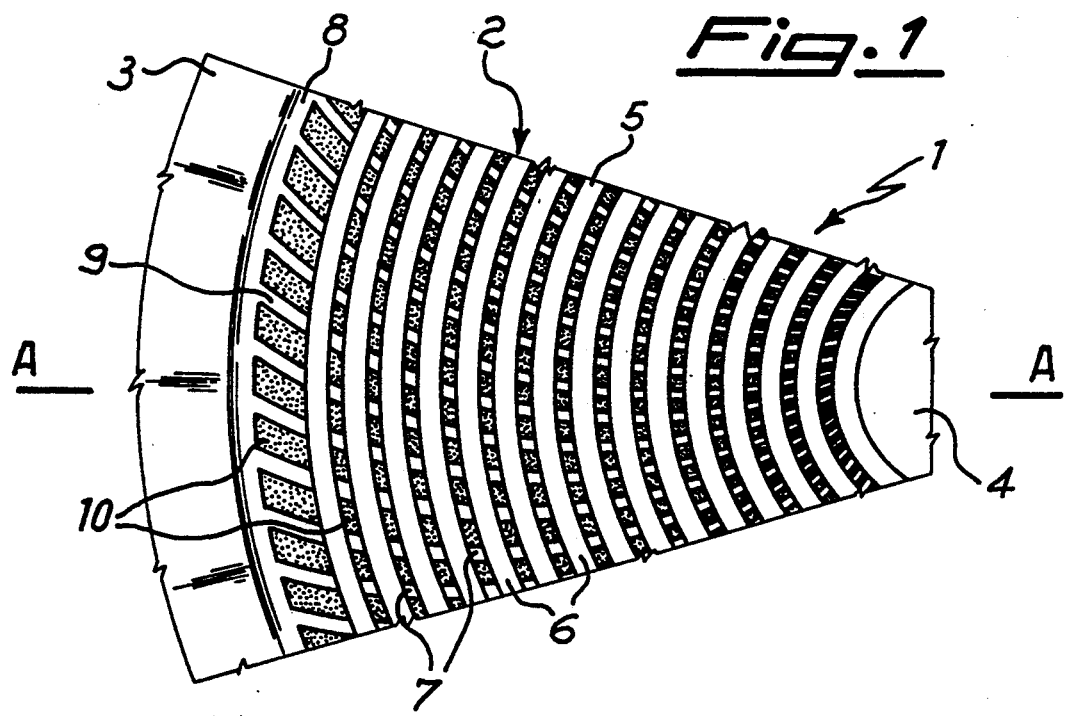
FIG. 1 is a partial plan view of a pan bottom according to the present invention.
Figure 2:
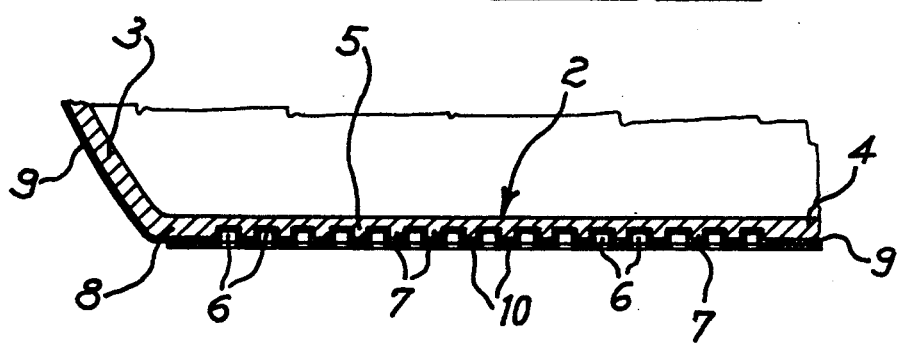
FIG. 2 is a schematic view of a cross-section of FIG. 1 along a plane of cut A—A.
Figure 3:
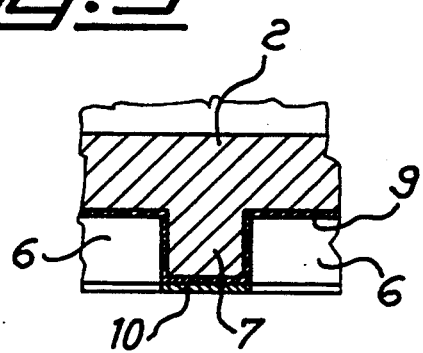
FIG. 3 is an enlarged schematic view of a part of FIG. 2.

With reference to FIGS. 1-3, the cooking vessel (1) as for example an aluminum or aluminum alloy pan comprises a flat bottom (2) and a side wall (3) bent outwardly. The external surface of the bottom (2) of the vessel (1) has three distinct surface parts, as follows:

a flat central circular area (4) which is preferably concentric around the geometric center of the vessel (1), a generally annular area (5) provided with a plurality of grooves (6) and concentric circular lands (7), and a flat annular peripheral area (8) radiused to the side wall (3).

In accordance with the present invention, the external surface of the bottom (2) is coated with two layers consisting of different enamels of which the first layer (9), in contact with the aluminum or aluminum alloy, is made of an enamel having high radiation heat absorption capacity and the second layer (10) is made of an enamel having high abrasion resistance.

The high radiation heat absorption capacity enamel is applied uniformly and in an unbroken manner over the entire bottom surface (2), including the central circular area (4), the grooves (6), the lands (7) and the annular peripheral area (8) and the side wall (3).

The layer (10) of high abrasion resistance enamel is applied only on the lands (7) and on the annular peripheral area (8) and in a broken manner, i.e. in segments, so that said lands (7) and said annular peripheral area (8) have portions not coated with the high abrasion-resistance enamel.

The parts coated with the layer (10) with high abrasion resistance represent the surface on which the vessel (1) rests.

The shape and dimensions of the segments coated with the high abrasion-resistance enamel are not critical and could be rectangular or square.

FIGS. 4 to 7 illustrate a preferred method of manufacture of the bottom (2) of a cooking vessel (1) of aluminum or aluminum alloy of the present invention.

First, the cooking vessel (1) is manufactured preferably by pressing of an aluminum plate (11) in a press including a die (12) and punch (13) having the form and dimensions of the desired vessel (1). The vessel (1) thus obtained is formed of a flat bottom (2) and a bent side wall (3). In the internal part of the vessel (1) is inserted a template (14) which receives the vessel and blocks it by a compressed air system. The template (14) is connected to a motor (not illustrated) by a shaft (15) so that said template and the vessel can be rotated around the axis of rotation of the motor.

At the external surface of the bottom (2) of the vessel (1) is the punch (16) of a lathe having straightline movements of approach and withdrawal of the bottom (2) and advancement of the peripheral area (8) toward the central area (4). By approaching and pressing the punch (16) against the bottom (2) and rotating the template (14) and simultaneously moving the punch (16) toward the central area (4), there are executed a plurality of equidistant concentric unbroken grooves (6) in the annular area (5) of the bottom (2) by removal of material.

The bottom (2) having grooves (6) and lands (7) is then sprayed over the entire external surface by a sprayer of nozzle (17) with a material (18) having high radiation heat absorption such as for example porcelain enamel or a silicone lake as generally employed for coating aluminum or aluminum alloy vessels. The spraying is done in a uniform and unbroken manner over the entire surface of the bottom (6) and the side wall (3).

The vessel (1) having the external surface of the bottom (2) and side wall (3) coated uniformly and completely with a layer (9) of silicone lake or porcelain enamel with high radiation heat absorption capacity is taken under the silk-screen process frame (19) consisting of a cloth screen with impression of the specific design which it is desired to obtain only on the lands (7), on the annular peripheral area (8) and optionally on the central part (4). The silk-screen process paste (20) is fed onto said frame (19) and spread by a rubber spatula (21).

The silk-screen process paste (20) filters only at the holes in the cloth screen of the silk-screen process frame (19) impressing by a broken layer (10) and in segments only the parts of the bottom (2) corresponding to said holes. The thickness of said layer (10) is on the order of 5–20 m$\mu$.

The vessel (1) is subsequently introduced in an oven with hot air circulation where it is baked at a temperature varying between 300° C. and 600° C. depending on the silk-screen process lake or enamel used.

The presence of the grooves (6), the coating with one layer (9) of enamel or lake having high radiation heat absorption capacity and subsequent coating with a layer (10) of high abrasion resistance enamel provides excellent heat transmission from the source to the cooking vessel combined with high abrasion resistance, not common in these types of vessels, and high dimensional stability even after prolonged use. The lands (7) between the grooves (6) act as reinforcement ribs which help hold flat the bottom surface. In addition, both the surface of the lands (7) and that of the grooves (6) absorb all kinds of heat, both conduction heat and radiation heat, and therefor the contact surface between the vessel and the heat source as well as the quantity of heat transmitted are greatly increased.

To these physical and technical characteristics and advantages are added unquestionable aesthetic advantages due to the color effect of the combination of colors of the two materials (18, 20) used.

Although the invention has been described in conjunction with a detailed embodiment, it is evident that many alternatives and variations will be apparent to those skilled in the art in the light of the foregoing description. Accordingly, the invention is intended to embrace all of the alternatives and variations that fall within the spirit and scope of the appended claims.

What I claim is:

1. A flat cooking vessel bottom (2) made of aluminum or an aluminum alloy, said bottom having side walls (3), said bottom having an external surface, said external surface being provided with concentric grooves (6) and lands (7) in the form of equidistant circles, said grooves being formed on said external surface by removal of portion of said aluminum or aluminum alloy from the bottom of said vessel, said grooves and lands being coated uniformly with a first layer (9) which is in contact with the aluminum or aluminum alloy, has a dark color and a dull surface and consists of a porcelain enamel based on an alkaline borosilicate having high radiation heat absorbing capacity, said external surface has a second layer (10), applied to the first layer, said second layer having high abrasion and scoring resistance and consisting of a porcelain enamel based on an alkaline borosilicate to which a hardening agent is added, said second layer (10) being applied only on the lands (7) discontinuously in segments.

2. The bottom according to claim 1, wherein the second layer (10) having high abrasion and scoring resistance consists of a porcelain enamel based on an alkaline borosilicate containing a hardening agent selected from the group consisting of alpha-alumina, silicon carbide, quartz, tungsten carbide, silico-aluminates, tungsten, titanium and stainlesss steel in the form of fine particles, mixed and diluted with a solvent or dispersant selected from the group consisting of pine oil, hydrogenated resin acids, hydrogenated rosin and ethylcellulose.

3. The bottom according to claim 1, wherein said external surface comprises three distinct surface parts:
a flat central circular area (4);
an annular area (5) provided with said grooves (6) and said lands (7); and
an annular peripheral area (8),
and said first layer (9) coats each of said flat central circular area (4), said grooves (6), said lands (7), said annular peripheral area (8) and said side walls (3).

4. The bottom according to claim 1, wherein said segments of said second layer (10) have a rectangular or square shape.

5. The bottom according to claim 1, wherein said second layer (10) is applied by silk-screen process by passing the enamel through a cloth screen with impression of the desired design.

6. The bottom according to claim 1, wherein said second layer (10) has a thickness between 5 and 20 micrometers.

7. The bottom according to claim 1, wherein the depth of each groove (6) ranges from 0.1 mm to 2 mm and the width from 1 mm to 3 mm.

8. The bottom according to claim 1, wherein the width of each land (7) ranges from 1 mm to 3 mm.

9. The bottom according to claim 2, wherein the hardening agent is present in an amount ranging from 10% to 40% by weight with respect to said ceramic enamel.

10. The bottom according to claim 2, wherein said porcelain enamel for the second layer (10) is the same used for the first layer (9).

11. A flat cooking vessel bottom (2) made of aluminum or an aluminum alloy, said bottom having side walls (3), said bottom having and external surface, said external surface being provided with concentric grooves (6) and lands (7) in the form of equidistant circles, said grooves being formed on said external surface by removal of portion of said aluminum or aluminum alloy from the bottom of said vessel, said grooves and lands being coated with two overlying layers, a first layer (9) being in contact with the aluminum or aluminum alloy, having a dark color and a dull surface and consisting of a porcelain enamel based on an alkaline borosilicate having high radiation heat absorbing capacity, and a second layer (10), applied to the first layer, having high abrasion and scoring resistance and consisting of a porcelain enamel other than said porcelain enamel which constitutes the first layer, said second layer containing a hardening agent, said second layer (10) being applied only on the lands (7) discontinuously in segments.

12. The bottom according to claim 11, wherein said second layer (10) is applied by a silk-screen process by passing the enamel through a cloth screen with impression of the desired design.

13. The bottom according to claim 11, wherein the second layer (10) having high abrasion and scoring resistance consists of a porcelain enamel containing a hardening agent selected from the group consisting of alpha-alumina, silicon carbide, quartz, tungsten carbide, silico-aluminates, tungsten, titanium and stainless steel in the form of fine particles, mixed and diluted with a solvent or dispersant selected from the group consisting of pine oil, hydrogenated resin acids, hydrogenated rosin and ethylcellulose.

14. The bottom according to claim 11, wherein said second layer (10) essentially consists of vitrified gold silicate with mica coated with iron oxides.

* * * * *